United States Patent Office 3,766,245
Patented Oct. 16, 1973

3,766,245
3,5-DIALKOXYALKOXY-4-SUBSTITUTED BENZOIC ACID ESTERS
Werner Hausermann, Allschwil, Ado Kaiser, Neu-Frenkendorf, and Marcel Scheer, Basel, Switzerland, assignors to Hoffmann-La Roche Inc., Nutley, N.J.
No Drawing. Original application Jan. 16, 1969, Ser. No. 791,793, now Patent No. 3,622,610. Divided and this application Mar. 4, 1971, Ser. No. 121,158
Claims priority, application Switzerland, Feb. 9, 1968, 1,972/68
Int. Cl. C07c 69/78
U.S. Cl. 260—473 R     5 Claims

ABSTRACT OF THE DISCLOSURE 3,5-bis-(benzyloxy)-4-methoxy-benzoic acid alkyl esters, are prepared, for example, from the corresponding 3,4,5-tris-(substituted-sulfonyloxy)-benzoic acid alkyl ester. The end products are useful in the preparation of 3,5-dihydroxy-4-methoxy-phenylalanines having hypotensive activity.

CROSS-REFERENCE TO RELATED APPLICATIONS

This application is a division of U.S. patent application Ser. No. 791,793, filed Jan. 16, 1969, now U.S. Pat. 3,622,610.

BRIEF DESCRIPTION OF THE INVENTION

The invention relates to the preparation of benzoic acid derivatives of the formula

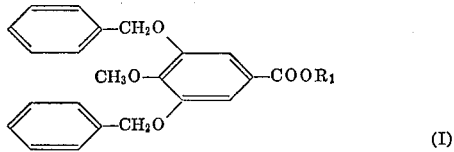

(I)

wherein $R_1$ is alkyl.

The compounds of Formula I are useful in the preparation of 3,5-dihydroxy-4-methoxy-phenylalanines having hypotensive activity.

In another aspect, the invention relates to intermediates for preparing the compound of Formula I.

DETAILED DESCRIPTION OF THE INVENTION

The benzoic acid derivatives of the formula

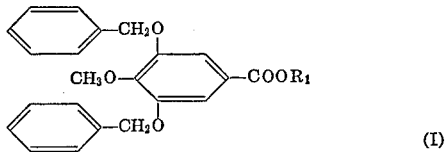

(I)

wherein $R_1$ is lower alkyl, are prepared by a process which comprises treating a compound of the formula

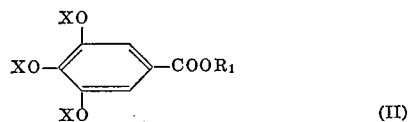

(II)

wherein $R_1$ is as previously described and X is lower alkylsulfonyl, phenylsulfonyl, phenylalkylsulfonyl or lower alkylphenylsulfonyl, with liquid ammonia, to yield a compound of the formula

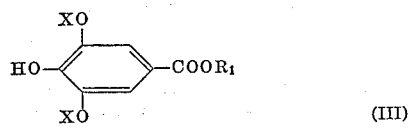

(III)

wherein $R_1$ and X are as previously described, methylating the compound of Formula III and reacting the reaction product thus obtained with a compound of the formula

(IV)

wherein Hal is halogen, in the presence of a base.

Alternatively, the compounds of Formula I are prepared by reacting a compound of the formula

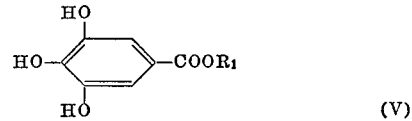

(V)

wherein $R_1$ is as previously described, with a compound of the formula $$R_2O-\overset{\overset{R'_3}{\|}}{C}-R_4$$  (VI)

wherein $R_2$ is alkyl or phenylalkyl, $R'_3$ is alkylidene, phenylalkylidene or, together with $R_2$, is alkanylylidene and $R_4$ is hydrogen or alkyl, to yield the compound of the formula

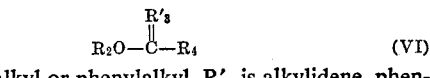

(VII)

wherein $R_1$ is alkyl, $R_2$ is alkyl or phenylalkyl, $R_3$ is alkyl, phenylalkyl or, together with $R_2$, alkylene, and $R_4$ is hydrogen or alkyl, methylating the compound of Formula III, acidically hydrolyzing the reaction product, and benzylating the reaction product thus obtained.

As used herein, the term "lower alkyl" denotes a straight or branched chain hydrocarbon group containing 1–6 carbon atoms, for example, methyl, ethyl, propyl, isopropyl, butyl, tertiary butyl and the like, preferably methyl and ethyl. The term "lower alkylidene" denotes a hydrocarbon group containing 1–6 carbon atoms, e.g., ethylidene, propylidene, butylidene and the like. The term "lower alkylene" denotes a straight chain or branched chain hydrocarbon group of 1–6 carbon atoms, for example, ethylene, propylene, butylene and the like. The term "lower alkanylylidene" denotes the straight chain alkanylylidene group, preferably of 3 or 4 carbon atoms, of a compound of Formula VI. Examples of compounds of Formula VI are: vinyl ethyl ether, vinyl isopropyl ether, methyl isopropyl ether, dihydrofuran or dihydropyran; preferably vinyl ethyl ether or dihydropyran. The alkyl residue of alkylsulfonyl, phenylalkylsulfonyl and alkylphenylsulfonyl denotes a lower alkyl of 1–6 carbon atoms. The substituted sulfonyl radicals comprise, for example, ethylsulfonyl, isopropylsulfonyl, n-hexylsulfonyl, p-tolylsulfonyl (tosyl); preferably methylsulfonyl (mesyl) and phenylsulfonyl. The term "halogen" denotes chlorine, fluorine, bromine and iodine; preferably chlorine and bromine.

According to one embodiment of the process in accordance with the invention, a tri-sulfonated) 3,4,5-trihydroxy-benzoic acid ester of Formula II is converted in three steps to the desired compound of Formula I. The first step comprises treatment of the compound of Formula II with liquid ammonia. By this means, surprisingly the substituted sulfonyl group in the 4-position is selectively cleaved off, with the retention of both the substituted sulfonyloxy groups in the 3- and 5-position and the carbalkoxy group to yield a compound of the formula

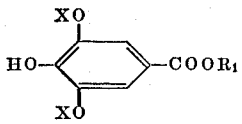

(III)

wherein X and R₁ are as previously described.

The reaction is conveniently effected at a temperature in the range of about −50° C. to 50° C., optionally under pressure. The liquid ammonia can serve as the solvent. However, the reaction can also be carried out in the presence of an inert organic solvent, for example, ether or toluene.

The compound of Formula III which is obtained is subsequently treated with a methylating agent such as, for example, dimethyl sulfate, methyl chloride, methyl bromide, methyl iodide or the like. The methylation is effected in the presence of an acid binding agent, for example, an alkali metal carbonate, such as, sodium carbonate or potassium carbonate, or an alkali metal alcoholate, such as, sodium methylate, potassium t-butylate or the like. The reaction is conveniently carried out at a temperature between about 0° C. and the boiling point of the reaction mixture. It is preferred to work in the presence of a solvent such as dimethylformamide, acetone, tetrahydrofuran or methanol. By this procedure there is obtained a compound of the formula

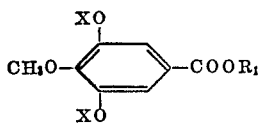

(VIII)

wherein X and R₁ are as previously described.

The compound of Formula VIII is then reacted with a benzyl halide, for example, benzyl chloride, in the presence of a base, for example, an alkali metal carbonate such as sodium carbonate, potassium carbonate or the like, or an alkali metal alcoholate such as sodium methylate or potassium t-butylate. In so doing, the substituted sulfonyloxy groups in the 3- and 5-position are surprisingly exchanged for benzyl groups. The reaction is conveniently effected at a temperature in the range of from about room temperature up to about the boiling point of the reaction mixture in an organic solvent such as, a lower alkanol, for example, methanol, ethanol or the like, or, for example, in dimethylformamide or dimethyl sulfoxide. By the reaction described there is obtained the desired benzoic acid ester of Formula I.

The benzoic acid ester of Formula II which is utilized as the starting compound can be obtained from a compound of Formula V by the reaction with a correspondingly substituted sulfonyl halide, such as, sulfonyl chloride, in the presence of a base such as potassium carbonate, triethylamine or pyridine, at a temperature between about room temperature and about the boiling point of the reaction mixture.

According to another embodiment of the process of the invention, a gallic acid ester of Formula V is converted utilizing an olefinic ether of Formula VI into the desired benzoic acid ester of Formula I. Firstly, the ester of Formula V is reacted with the ether of Formula VI, resulting surprisingly in a selective 3,5-disubstitution with the retention of the 4-OH group. The reaction is advantageously effected at a temperature between about 0° and about 60° C. with or without the addition of an inert solvent. As solvents, there can be used, for examples, tetrahydrofuran, dimethylformamide, toluene, dioxan or the like. The reaction can be effected in the presence of an acidic catalyst such as, for example, concentrated aqueous hydrochloric acid, p-toluenesulfonic acid, phosphorus oxychloride or the like.

The compound of the formula

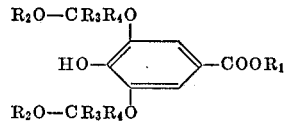

(VII)

wherein R₁ is alkyl, R₂ is alkyl or phenylalkyl, R₃ is alkyl, phenylalkyl or, together with R₂, alkylene, and R₄ is hydrogen or alkyl, obtained as described above is subsequently methylated in the manner described above to yield the corresponding 4-O-methylated compound. The latter is then subjected to an acidic hydrolysis. By this means, the protecting groups in the 3- and 5-position are cleaved off with the formation of the corresponding 3,5-dihydroxy-4-methoxy-benzoic acid ester. The hydrolysis is conveniently effected in the presence of catalytic amounts of mineral acid, for example, hydrochloric acid or sulfuric acid or also oxalic acid, at a temperature between about room temperature and about the boiling point of the reaction mixture.

The conversion of the gallic acid ester of Formula V into the corresponding 3,5-dihydroxy-4-methoxy-benzoic acid ester in accordance with the invention can be carried out in three steps which are differentiated from each other with corresponding isolation of the intermediate product formed. However, one can also advantageously work without isolation of the intermediate compound of Formula VII and its methylation product.

The 3,5-dihydroxy-4-methoxy-benzoic acid ester obtained is finally benzylated utilizing benzyl halide, preferably benzyl chloride or benzyl bromide. The reaction is effected in the presence of a base, for example, an alkali metal carbonate such as sodium carbonate, potassium carbonate or the like, an alkali metal alcoholate such as sodium methylate, potassium t-butylate or the like, or an alkali metal hydride such as sodium hydride. The temperature conveniently lies between about room temperature and about the boiling point of the reaction mixture. Advantageously an organic solvent, for example, a lower alkanol such as methanol or ethanol, or dimethylformamide or dimethyl sulfoxide may be utilized.

The compounds of Formula I can be converted to the useful hypotensive agents of formula

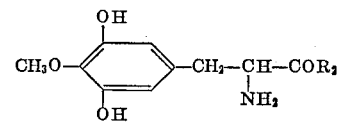

(Ia)

wherein R₂ represents hydroxyl, lower alkoxy, amino or dimethylamino, optical isomers (preferably the L-antipodes) thereof and their pharmaceutically acceptable salts.

Representative compounds of Formula Ia are:

DL-3,5-dihydroxy-4-methoxy-phenylalanine or its L-optical antipode;

DL-3,5-dihydroxy-4-methoxy-phenylalanine ethyl ester or its L-optical antipode;

DL-3,5-dihydroxy-4-methoxy-phenylalanine amide or its L-optical antipode;

DL-3,5-dihydroxy-4-methoxy-phenylalanine dimethylamide or its L-optical antipode;

and the like.

The conversion of the compounds of Formula I to the compounds of Formula Ia can be effected as follows: reduction with a complex metal hydride such as lithium aluminum hydride into the corresponding alcohol; reaction with a halogenating agent, for example, thionyl chloride to form the correspondingly substituted benzyl halide; and reaction with an alkali metal salt of an acylaminomalonic acid diester, for example, a sodium salt of acetamidomalonic acid diethyl ester to yield 3,5-bis-(benzyloxy)-4- methoxy-benzyl-acylamino-malonic acid ester which then can be converted by hydrogenation, hydrolysis and decarboxylation into, for example, 3,5-dihydroxy-4-methoxy-phenyl-alanine having blood-pressure lowering properties. This process is further exemplified in U.S. patent application Ser. No. 704,506, filed Feb. 12, 1968, now U.S. Pat. 3,637,804, "Phenylalanine Derivatives and Preparation Thereof," Hegedüs et al.

Compounds represented by Formula Ia possess valuable pharmaceutical properties, for example, each of the compounds is useful as a hypotensive agent.

When administered, for example, orally to hypertonic rats, they produce a hypotensive effect in single doses. By way of illustration the compound of Example 1 which has an $LD_{50}$ of >5,000 mg./kg. (p.o.) in rats and mice and can be administered to rats for 6 weeks in dosages of 2,000 mg./kg. day without showing any undesirable side effects such as sedative effects, exhibits hypotensive activity in the blood pressure test when administered at single oral doses of 50 mg./kg. to 200 mg./kg.

The compounds of Formula Ia have hypotensive effects similar in many respects to those of α-methyldopa, which is well known for its therapeutic uses and properties. However, whereas α-methyldopa in addition to showing hypotensive activity on peripheral organs also exerts a corresponding sedative side-effect on the CNS (as evidenced, e.g., on the decrease of the catechol amine level in the brains of rats) the compounds of the present invention show a significantly lower sedative side-effect, as evidenced from measurements of the catechol amine level in the brains of rats given p.o. single doses of 50 mg./kg. to 200 mg./kg.

Thus the compounds of Formula Ia demonstrate a pattern of activity associated with potent hypotensives of known clinical efficacy while in addition showing a minimum of disturbing side effects. The compounds of the invention are therefore useful as hypotensive agents in the treatment of such pathological conditions as essential hypertonia.

The compounds of Formula Ia are white crystalline solids which have basic and acidic properties and can be conveniently prepared as such as in the form of their acid and base addition salts. Said salts are characteristically crystalline solids soluble in water, somewhat less soluble in polar solvents such as methanol, ethanol and the like and relatively insoluble in non-polar solvents such as benzene, ether and petroleum ether and the like. The free amino acid is also soluble in methanol.

The compounds of Formula Ia can be used in the form of conventional pharmaceutical preparations, for example, they or their salts can be used in admixture with a pharmaceutical organic or inorganic inert carrier which is suitable for enteral, percutaneous or parenteral application, e.g., water, gelatin, gum arabic, lactose, starch, magnesium stearate, talcum, vegetable oils, polyalkylene glycols, Vaseline and the like. The pharmaceutical preparations can be administered in solid form, e.g., as tablets, dragées, suppositories or capsules, in semi-solid forms, e.g., as salves or in liquid form, e.g., as solutions, suspensions or emulsions. The preparations may be sterilized and/or contain additives such as preserving, stabilizing, wetting or emulsifying agents, salts for varying the osmotic pressure or buffers. They can also contain other therapeutically valuable substances.

The compounds of Formula Ia, in the form of the free acid, have amphoteric character and are readily soluble in water, acids and alkalis. The compounds can form salts and alkalis, e.g., salts can be formed by the carboxyl groups with bases and by the amino group with acids. The compounds of Formula I also form esters with lower aliphatic alcohols, preferably methanol or ethanol. The compounds can also be converted into amides.

The following examples further illustrate the invention. All temperatures are in degrees centigrade, unless otherwise mentioned.

Example 1

60 g. of 3,4,5-tris-(phenylsulfonyloxy)-benzoic acid methyl ester are heated at 23° C. in an autoclave with 300 ml. of liquid ammonia over a period of 14 hours. After removal of the ammonia under nitrogen gassing, the residue is heated to 50° C. with 300 ml. of methanol and 400 ml. of water, and, subsequently, cooled to 10° C. The crystals which form are removed by filtration and suspended in 200 ml. of water maintained at 50° C. The suspension is adjusted to pH 2 by addition of 2 N aqueous sulfuric acid and again cooled. The crystals are removed by filtration and recrystallized once from methanol to yield 3,5-bis-(phenylsulfonyloxy)-4-hydroxy-benzoic acid methyl ester having a melting point of 157°–160° C.

A mixture containing 30.9 g. of 3,5-bis-(phenylsulfonyloxy)-4-hydroxy-benzoic acid methyl ester, 288 ml. of absolute dimethylformamide, 11.5 g. of dimethyl sulfate and 36 g. of potassium carbonate is heated at 70° C. with stirring for a period of 14 hours. The insoluble portions are removed by filtration and rinsed with 200 ml. of absolute dimethylformamide. The filtrate is evaporated under reduced pressure. The oily residue is crystallized by heating with 200 ml. of 2 N aqueous acetic acid. The crystals are removed by filtration, washed with water and recrystallized twice from methanol to yield 3,5-bis(phenylsulfonyloxy)-4-methoxy-benzoic acid methyl ester having a melting point of 105°–107° C.

A mixture containing 15 g. of 3,5-bis-(phenylsulfonyloxy)-4-methoxy-benzoic acid methyl ester, 300 ml. of absolute methanol, 20 g. of benzyl chloride and 22 g. of potassium carbonate is boiled with stirring under an atmosphere of argon over a 24-hour period. The mixture is filtered hot. The residue is rinsed with 100 ml. of boiling methanol and the filtrate is evaporated under reduced pressure. The residue is treated with 100 ml. of water and subsequently extracted twice with 200 ml. of benzene each time. After drying over sodium sulfate, the benzene extracts are evaporated under reduced pressure. The oily residue crystallizes after trituration with petroleum ether. The crystals are removed by filtration and recrystallized twice from acetic ester to yield 3,5-bis-(benzyloxy)-4-methoxy-benzoic acid methyl ester having a melting point of 114°–116° C.

The 3,4,5-tris-(phenylsulfonyloxy)-benzoic acid methyl ester employed as the starting compound can be manufactured as follows:

550 g. of benzenesulfonyl chloride are added dropwise under an atmosphere of argon with stirring to a solution containing 182 g. of gallic acid methyl ester in 1000 ml. of absolute pyridine in such a manner that the temperature does not rise above 70° C. After the addition, the mixture is further stirred at 80° C. for 3 hours. The mixture, cooled to 10° C., is subsequently poured onto 2000 ml. of ice water. The precipitate, which initially separates out as an oil, crystallizes on heating to 20° C. The crystals are removed by filtration, washed with water and, after drying, recrystallized twice from methylene chloride/methanol to yield 3,5-tris-(phenylsulfonyloxy)-benzoic acid methyl ester having a melting point of 119°–121° C.

Example 2

In the same manner as set forth in Example 1, 3,5-bis-(benzyloxy)-4-methoxy-benzoic acid methyl ester is obtained from 3,4,5-tris-(methylsulfonyloxy)-benzoic acid methyl ester (melting point 159°–162° C. from methylene chloride/methanol), 3,5-bis-(methylsulfonyloxy)-4-hydroxy-benzoic acid methyl ester (melting point 143°–146° C. from methanol) and 3,5-bis-(methylsulfonyloxy)-4-methoxy-benzoic acid methyl ester (melting point 95°–98° C. from acetic ester/ether). The 3,5-bis-(benzyloxy)-4-methoxy-benzoic acid methyl ester thus obtained is identical with the compound obtained in Example 1.

The 3,4,5-tris-(methylsulfonyloxy)-benzoic acid methyl ester employed as starting compound can, in the same manner as described in Example 1, be prepared starting with gallic acid methyl ester and methylsulfonyl chloride to yield 3,4,5-tris(methylsulfonyloxy)-benzoic acid methyl ester having a melting point of 159°–162° C. after recrystallization from methylene chloride/methanol.

The 3,5 - bis - (methylsulfonyloxy)-4-methoxy-benzoic acid methyl ester can also be prepared as follows:

A mixture containing 10 g. of 3,5-bis-(methylsulfonyloxy)-4-hydroxy-benzoic acid methyl ester, 200 ml. of acetone, 5.1 g. of dimethyl sulfate and 17.7 g. of potassium carbonate is stirred at 13° C. for 7 hours. After filtration and rinsing with 50 ml. of acetone, the filtrate is concentrated under reduced pressure at 25° C. The oily residue is treated with 200 ml. of water and extracted twice with 200 ml. of ethyl acetate each time. After drying over sodium sulfate, the organic extracts are evaporated under reduced pressure, and the residue is recrystallized twice from ethyl acetate/ether to yield 3,5-bis-(methylsulfonyloxy)-4-methoxy-benzoic acid methyl ester having a melting point of 95°–98° C.

Example 3

A mixture containing 20 g. of gallic acid methyl ester, 40 ml. of absolute tetrahydrofuran and 38 g. of dihydropyran is treated with 0.05 ml. of phosphorus oxychloride. The temperature spontaneously rises to 43° C. and thereafter, the mixture is maintained at room temperature for 12 hours. The obtained clear solution containing 3,5-bis-(tetrahydropyranyloxy)-4-hydroxybenzoic acid methyl ester, is added to a mixture containing 400 ml. of absolute dimethylformamide and 67 g. of potassium carbonate. This mixture is treated with 21 g. of dimethyl sulfate and stirred for 12 hours at 70° C. in an atmosphere of argon. After cooling, the mixture is filtered, rinsed with 100 ml. of absolute dimethylformamide and the combined filtrates are evaporated under reduced pressure. The residue is partitioned between 300 ml. of toluene and 100 ml. of water. The aqueous phase is extracted further with 200 ml. of toluene. The toluene extracts are combined, and, after drying over sodium sulfate, are evaporated under reduced pressure. The residue, consisting of crude 3,5-bis-(tetrahydropyranyloxy)-4-methoxy-benzoic acid methyl ester, is heated under reflux conditions in 100 ml. of absolute methanol containing 1 g. of oxalic acid dihydrate for 1 hour, subsequently cooled, treated with 50 ml. of water and extracted twice with 200 ml. portions of petroleum ether. The petroleum ether extracts are washed with 100 ml. of methanol/water (1:1). The aqueous aqueous methanolic extracts are evaporated to a volume of about 30 ml. under reduced pressure. The concentrated solution is adjusted to pH 5 with saturated aqueous sodium bicarbonate solution and maintained at 4° C. for 48 hours. The precipitate which separates out is removed by filtration, washed with a little water and dried. The crystals which form are heated with 400 ml. of benzene, to dissolve a portion thereof. The undissolved crystals are removed by filtration while hot and washed with 100 ml. of boiling benzene. As a by-product there is obtained gallic acid methyl ester having a melting point of 192–198° C. The filtrate, combined with the wash-benzene, is concentrated to about 200 ml. under reduced pressure and subsequently maintained at 4° C. for 12 hours. The colorless crystals which separate out are removed by filtration, washed with petroleum ether and dried to yield 3,5-dihydroxy-4-methoxy-benzoic acid methyl ester having a melting point of 137°–140° C.

79.4 g. of 3,5-dihydroxy-4-methoxy-benzoic acid methyl ester, 400 ml. of dimethylformamide and 166 g. of anhydrous potassium carbonate are heated at 90° C. with stirring in an atmosphere of argon and treated dropwise over a period of about 30 minutes with 105 ml. of benzyl chloride. After stirring at 90–95° C. for 2½ hours, the mixture is cooled for 12 hours. Subsequently, the reaction mixture is poured onto 4100 ml. of water and extracted with methylene chloride. The organic phase is washed once with water and dried over sodium sulfate. The dried methylene chloride phase is removed by filtration and evaporated under reduced pressure. The residue is recrystallized once from acetic ester to yield 3,5-bis-(benzyloxy)-4-methoxy-benzoic acid methyl ester as crystals having a melting point of 120°–122° C.

Example 4

18.4 g. of gallic acid methyl ester in 50 ml. of absolute tetrahydrofuran are treated dropwise over a period of 15 minutes with 28.8 g. of ethyl vinyl ether while the temperature is maintained below 45° C. by cooling. The mixture is stirred for an additional 75 minutes, whereby it slowly cools to room temperature. After the addition of 1 drop of phosphorus oxychloride, the mixture is stirred at room temperature for an additional 1½ hours. Subsequently, the mixture is extracted into 50 ml. of 2 N sodium carbonate solution and with toluene. The organic phase is washed with sodium chloride solution, dried over sodium sulfate and evaporated under reduced pressure to an oil. This oil consists of 3,5-bis-(1-ethoxy-ethoxy)-4-hydroxy-benzoic acid methyl ester and is reacted further without additional purification.

The oily 3,5-bis-(1-ethoxy-ethoxy)-4-hydroxy-benzoic acid methyl ester obtained above is dissolved in 300 ml. of dimethylformamide and stirred at 70° C. for 12 hours with a mixture of 18.9 g. of dimethyl sulfate and 48.3 g. of potassium carbonate. Subsequently, the reaction mixture is filtered and the filtrate evaporated under reduced pressure. The residue is partitioned between benzene and water. The organic phase is washed with water, twice with saturated sodium chloride solution, dried over sodium sulfate and evaporated to yield 3,5-bis-(1-ethoxy-ethoxy)-4-methoxy-benzoic acid methyl ester as a dark red oil which is reacted further without additional purification.

The 3,5-bis-(1-ethoxy-ethoxy)-4-methoxy-benzoic acid methyl ester obtained above is heated under reflux conditions for 1 hour in 150 ml. of absolute methanol in the presence of 1 g. of crystalline oxalic acid. The reaction mixture is thereafter diluted with an equal amount of water and extracted twice with petroleum ether. The methanol/water phase is evaporated until the methanol has been expelled and thereafter, shaken with ethyl acetate. The ethyl acetate phase is combined with the petroleum ether phase, and the combined organic phase is washed with water and twice with saturated sodium solution. After drying over sodium sulfate and evaporation, there is obtained a dark oil which slowly crystallizes. The crystals which are obtained are maintained at the boiling temperature for 30 minutes in 150 ml. of benzene. Gallic acid methyl ester thereby precipitates, which is removed by filtration. The filtrate is evaporated, taken up in dibutyl ether, purified with animal charcoal and, after the addition of petroleum ether, crystallized to yield 3,5-dihydroxy-4-methoxy-benzoic acid methyl ester having a melting point of 135°–138° C.

The conversion of 3,5-dihydroxy-4-methoxy-benzoic acid methyl ester to 3,5-bis-(benzyloxy)-4-methoxy-benzoic acid methyl ester is effected in the same manner as described in Example 3. The compound obtained is identical with the 3,5-bis-(benzyloxy)-4-methoxy-benzoic acid methyl ester obtained in Example 3.

Example 5

3,5-bis-(benzyloxy)-4-methoxy-benzoic acid methyl ester is reduced with lithium aluminum hydride in tetrahydrofuran to 3,5-bis-(benzyloxy)-4-methoxy-benzyl alcohol [M.P. 98°–100° C.]. This product is chlorinated with thionyl chloride in benzene to yield 3,5-bis-(benzyloxy)-4-methoxy-benzyl chloride having a melting point of 76°–78° C. after recrystallization from heptane.

A solution containing 55 g. of acetamidomalonic acid diethyl ester in 280 ml. of dimethylformamide is added dropwise with vigorous stirring to a suspension containing 12.1 g. of sodium hydride in 280 ml. of dimethylformamide. To the clear solution which forms with the evolution of hydrogen, there is added dropwise with further stirring, a solution containing 93 g. of 3,5-bis-(benzyloxy)-4-methoxy-benzyl chloride in 20 ml. of dimethylformamide. Thereafter, the reaction mixture is heated on the steam-bath for 3 to 5 hours with stirring. The neutral mixture is made acidic with a few drops of ethanolic hydrochloric acid, and the dimethylformamide is substantially removed by evaporation under reduced pressure. The residue is partitioned between methylene chloride and water. The methylene chloride phase is washed two to three times with water, dried over calcium chloride and concentrated to a small volume under reduced pressure. The concentrate is diluted with about 500 ml. of ether. The crystalline 3,5-bis-(benzyloxy)-4-methoxy-benzyl-acetamido-malonic acid diethyl ester which precipitates has a melting point of 104°–106° C.

19 g. of 3,5-bis-(benzyloxy)-4-methoxy-benzyl-acetamido-malonic acid diethyl ester are treated with a solution containing 3.5 g. of sodium hydroxide in 100 ml. of water and heated under reflux conditions for 6 to 7 hours. The slightly turbid solution is adjusted to a pH of about 3 warm by addition of concentrated hydrochloric acid. After the cessation of the evolution of carbon dioxide, the mixture is again heated to boiling for 30 minutes and adjusted to pH 1 with hydrochloric acid. The crystalline DL-3,5-bis-(benzyloxy)-4-methoxy-phenyl-N-acetyl-alanine which precipitates, has a melting point of 146°–147° C.

50 g. of DL-3,5-bis-(benzyloxy)-4-methoxy-phenyl-N-acetyl-alanine are suspended in 300 ml. of ethyl alcohol and hydrogenated with palladium-carbon, whereby it dissolves with an uptake of about 6 liters of hydrogen. After complete hydrogen uptake, the solution is filtered and evaporated under reduced pressure. The residue is treated with 500 ml. of 2 N hydrochloric acid and heated under reflux conditions for 4 to 5 hours. Subsequently, the reaction mixture is evaporated under reduced pressure, diluted with water and again evaporated. The evaporation with water is repeated two to three times. The concentrate is then dissolved in 200 ml. of water, filtered clear in the hot with the help of decolorizing carbon and adjusted to a pH of 5.5 to 6.6 by addition of diethylamine. The crystalline DL-3,5 - dihydroxy-4-methoxy-phenyl-alanine which precipitates in the cold contains, when air-dried, exactly 1.5 mol. of water of crystallization and has a melting point of 272°–275° C. The water of crystallization can be removed by drying at 100° C. in high vacuum. The compound free of water of crystallization is strongly hygroscopic.

Example 6

Manufacture of tablets of the following composition:

| | G. |
|---|---|
| DL-3,5-dihydroxy-4-methoxy-phenylalanine | 100 |
| Lactose | 61 |
| Maize starch | 30 |
| Polyvinylpyrrolidone | 4 |
| Talcum | 5 |
| | 200 |

The active substance is mixed with the lactose and the maize starch, and after addition of a solution of the polyvinylpyrrolidone in 40 ml. of ethyl alcohol granulated. The granulate is dried at 30°, mixed with the talcum and pressed to tablets.

| | Mg. |
|---|---|
| Individual weight of one tablet | 200 |
| Active substance content of one tablet | 100 |

Example 7

Manufacture of gelatin capsules of the following composition:

| | Grams |
|---|---|
| DL-3,5-dihydroxy-4-methoxy-phenylalanine | 200 |
| Mannitol | 395 |
| Stearic acid | 5 |
| Total | 600 |

The ingredients are homogenously mixed and filled into interlocking capsules via a capsule filling machine.

| | Mg. |
|---|---|
| Individual weight of one capsule | 600 |
| Active substance content of one capsule | 200 |

Example 8

Manufacture of gelatin capsules of the following composition:

| | Grams |
|---|---|
| DL-3,5-dihydroxy-4-methoxy-phenylalanine | 500 |
| Stearic acid | 5 |
| Total | 505 |

The ingredients are homogenously mixed and filled into interlocking capsules via a capsule filling machine.

| | Mg. |
|---|---|
| Individual weight of one capsule | 505 |
| Active substance content of one capsule | 500 |

Example 9

To illustrate the therapeutic activity of the compounds of this invention as hypotensives, normal adult rats are operated according to A. Grollman, Proc. Soc. exp. Biol. (N.Y.) 57 102–104 (1944) and implanted with desoxycorticosterone acetate. The animals are thereafter fed 0.9% sodium chloride solution an lib. This treatment created a hypertension in the rats. The so-treated hypertensive rats are each given a peroral dose of gum arabic solutions containing 100 mg./kg. of 3,5-dihydroxy-4-methoxy-phenylalanine (A) twice daily for 2½ days and the hypotensive response measured by the change of blood pressure was obtained at intervals according to the following table:

| Time | Administration of 100 mg./kg. of A | Change of blood pressure, mm. Hg |
|---|---|---|
| 1st day: | | |
| 10 a.m. | Yes | |
| 11 a.m. | | −25 |
| 1 p.m. | | |
| 3 p.m. | Yes | |
| 2d day: | | |
| 9 a.m. | | −17 |
| 10 a.m. | Yes | |
| 1 p.m. | | −26 |
| 3 p.m. | Yes | |
| 3d day: | | |
| 9 a.m. | | −19 |
| 10 a.m. | Yes | |
| 1 p.m. | | −32 |
| 3 p.m. | | |
| 4th day: 9 a.m. | | −18 |

It is evident that the hypotensive response of Compound A when administered in daily oral doses of 2×100 mg./kg. is substantial and long lasting (note that hypotensive effect was still present on the 4th day 23 hours after the last application).

Example 10

This example serves to illustrate the comparative absence of sedative side effects associated with the use of 3,5-dihydroxy-4-methoxyphenylalanine (A) when compared with α-methyl-dopa (B). The test utilized in this example is a rotating rod test which serves to screen chemical compounds for effects on muscle tone and/or muscular coordination whereby being indicative of sedative properties. The method employed is a modification of that described by M. W. Dunkan and T. S. Miya: J. A. Ph. A. Sci. Ed. 46, 208 (1957). (CF–1 mice selected on the basis of their ability of remaining for two minutes on a rod 30 millimeters in diameter) rotating at 16 revolutions per minute are used. Groups of eight mice per dose level are placed on the rotating rods 30 minutes after drug administration and observed for two minutes. Those which fail to remain on the rod for the full two minutes are considered to be affected by the drug. The results of this test are summarized in the following table:

INHIBITION OF MUSCLE TONE AND/OR COORDINATION IN MICE, MEASURED ON THE ROTATING ROD

| Compound | Dose, mg./kg., p.o. | Reduction in hold time | In percent,[1] after min. | Duration of effect, hrs. | HD50,[2] mg./kg., p.o. |
|---|---|---|---|---|---|
| A | 300<br>100<br>30 | 13<br>29<br>11 | 30 | | >300 |
| B | 300<br>100<br>30 | 60<br>38<br>0 | 180 | >4 | 180 |

[1] The holding time was measured repeatedly during 4 hours. The time given here represents the point in time where the strongest reduction was observed.
[2] HD50 is that dose after which 50% of the mice can stay on the slowly rotating rod for less than 2 minutes.

The above table shows that 3,5-dihydroxy-4-methoxyphenylalanine substantially influence the position and holding reflexes of the mouse thereby showing absence of sedative properties. In contrast to this, α-methyl-dopa showed substantial sedative side effects.

We claim:
1. A compound of the formula

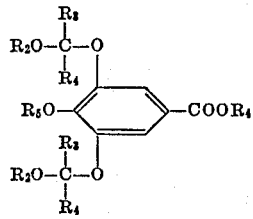

wherein $R_1$ is lower alkyl; $R_2$ is lower alkyl; $R_3$ is lower alkyl; $R_4$ is selected from the group consisting of hydrogen and lower alkyl; and $R_5$ is selected from the group consisting of hydrogen and methyl.

2. A compound in accordance with claim 1 wherein $R_5$ is hydrogen.

3. A compound in accordance with claim 1 wherein $R_5$ is methyl.

4. A compound in accordance with claim 2, wherein $R_1$ is methyl; $R_2$ is ethyl; $R_3$ is methyl; and $R_4$ is hydrogen, i.e., 3,5-bis(1-ethoxy-ethoxy)-4-hydroxy-benzoic acid methyl ester.

5. A compound in accordance with claim 3, wherein $R_1$ is methyl; $R_2$ is ethyl; $R_3$ is methyl; and $R_4$ is hydrogen, i.e., 3,5 - bis - (1-ethoxy-ethoxy)-4-methoxy-benzoic acid methyl ester.

References Cited
UNITED STATES PATENTS
2,483,099    9/1949    Morris et al. _____ 260—473 S OTHER REFERENCES
Hegedues et al.: C.A. 72 101110c (1970).
Rabjohn et al.: J. Org. Chem. 22 986 (1957).

LORRAINE A. WEINBERGER, Primary Examiner
J. F. TERAPANE, Assistant Examiner

U.S. Cl X.R.
260—473 S

UNITED STATES PATENT OFFICE
CERTIFICATE OF CORRECTION

Patent No. 3,766,245       Dated  October 16, 1973

Inventor(s)  Werner Hausermann, Ado Kaiser and Marcel Scheer

It is certified that error appears in the above-identified patent and that said Letters Patent are hereby corrected as shown below:

Column 12, claim 1, lines 3-12,

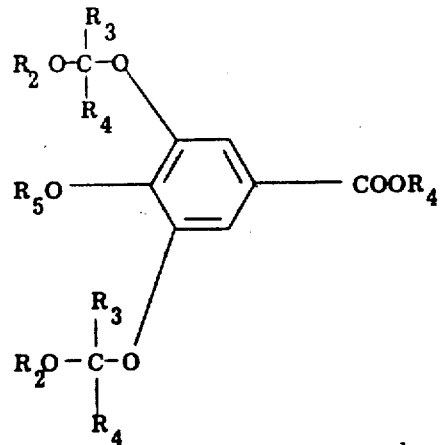

should be:

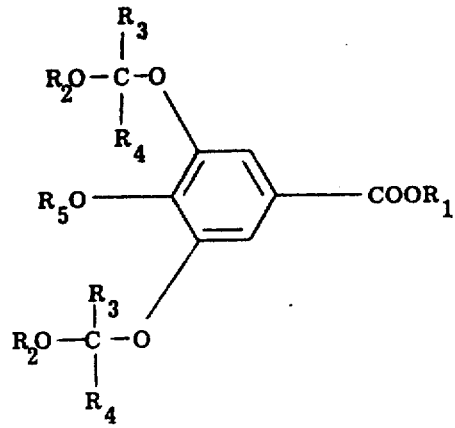

Signed and sealed this 6th day of August 1974.

(SEAL)
Attest:

McCOY M. GIBSON, JR.
Attesting Officer

C. MARSHALL DANN
Commissioner of Patents